United States Patent

[11] 3,568,781

[72] Inventors John W. E. Campbell
 Ramla, Altwood Drive, Maidenhead, Berkshire;
 Martin C. Peters, 18 Ewhurst Close, Nonsuch Vale, Cheam, Surrey; Alfred J. Perrin, 2 Windermere Ave, S. Kenton, Harrow, Middlesex, England
[21] Appl. No. 671,381
[22] Filed Sept. 28, 1967
[45] Patented Mar. 9, 1971
[32] Priority Sept. 29, 1966
[33] Great Britain
[31] 43669/66

[54] METHOD OF OPERATING LIQUID METAL COOLED NUCLEAR REACTOR
 9 Claims, 2 Drawing Figs.
[52] U.S. Cl............................................... 176/65, 176/40, 176/64, 122/32
[51] Int. Cl.................................................. G21c 15/28
[50] Field of Search........................................ 176/65, 40, 60

[56] References Cited
UNITED STATES PATENTS

| | | | |
|---|---|---|---|
| 3,421,978 | 1/1969 | Gollion et al. ................ | 176/65 |
| 3,434,924 | 3/1969 | Pouderoux .................... | 176/65 |
| 3,197,380 | 7/1965 | Dahlgren....................... | 176/65 |
| 3,393,664 | 7/1968 | Worley et al. ................. | 176/60X |

FOREIGN PATENTS

| | | | |
|---|---|---|---|
| 846,996 | 9/1960 | Great Britain................ | 176/65 |

*Primary Examiner*—Reuben Epstein
*Attorney*—Joseph M. Maguire

ABSTRACT: This invention relates to a nuclear reactor which utilizes liquid metal as a coolant medium in the primary coolant circuit to transfer heat from the core region of the reactor to a tubulous vapor generating unit. A recirculation branch is connected around a portion of the primary coolant circuit which contains the vapor generating tubes and means are provided to recirculate the primary coolant through the recirculation branch at a rate sufficient to ensure that the heat flux at the vapor generating tubes is less than the heat flux at which a departure from nucleate boiling occurs within the tubes.

3,568,781

METHOD OF OPERATING LIQUID METAL COOLED NUCLEAR REACTOR

BACKGROUND AND SUMMARY OF THE INVENTION

Since the metals normally utilized, in the liquid state, as primary coolant, such as sodium or potassium or an alloy of sodium and potassium, have a relatively high coefficient of heat conductivity, the heat input to vapor generating tubes of the unit is liable to exceed the rate at which a departure from nucleate boiling occurs together with a temperature fluctuation within the tubes and an instability in the fluid flow results, which in extreme cases might lead to tube failure.

According to the present invention there is provided a nuclear reactor including a liquid metal primary coolant circuit arranged to transfer heat from a core region of the nuclear reactor to a tubulous vapor generating unit and having a recirculation branch connected around a portion of the circuit containing vapor generating tubes and means arranged to recirculate the primary coolant through the branch at a rate sufficient to ensure that the heat flux at the vapor generating tubes is less than that at which a departure from nucleate boiling occurs within the tubes.

Suitably, a mixing chamber at the junction of the primary coolant circuit and the outlet of the recirculation branch may be provided to effect intimate mixing of coolant from the recirculation branch and coolant flowing in the primary coolant circuit.

DESCRIPTION OF THE PREFERRED EMBODIMENTS

Figure 1:
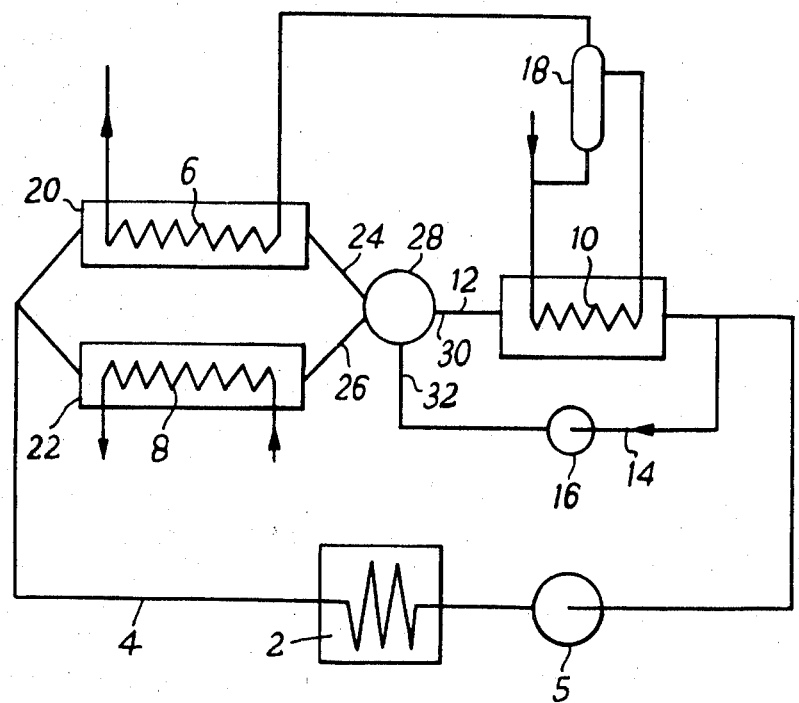
FIG. 1 is a schematic of the inventive arrangement.

The invention will now be described, by way of example, with reference to the accompanying diagram, in which a liquid sodium cooled nuclear reactor 2 includes a primary coolant circuit 4 having a circulating pump 5 and containing tubulous steam superheating and reheating surfaces 6, 8 and steam generating tubes 10 operating at a pressure in the region of 175 kilograms per square centimeter and 550° C. The steam generating tubes 10 are positioned within a portion 12 of the liquid sodium circuit provided with a recirculation branch 14 having a variable-speed recirculation pump 16. The steam generating tubes 10 operate with forced flow of water therein discharging to a separating drum 18 and are disposed in parallel flow relationship to the flow of sodium. Alternatively, the flow of fluid within the steam generating tubes may be in the opposite direction to the flow of sodium, or the steam generating tubes may operate with a once-through, forced flow of water therein in parallel or counterflow relationship to the flow of sodium.

The steam superheating and reheating surfaces 6, 8 are positioned in separate, parallel, sodium flow paths 20, 22 which terminate in inlets 24, 26 to a spherical mixing chamber 28 substantially diametrically opposite to an outlet 30 from the chamber to the sodium flow path 12 containing the steam generating tubes 10. The recirculation branch 14 discharges through an inlet 32 to the mixing chamber 28 on a radius of the chamber midway between inlets 24, 26 and the outlet 30. Thus the recirculated flow of sodium is discharged to the chamber 28 substantially perpendicularly to the main flow of sodium through the chamber and intimate mixing of the flows is effected, the diameter of the spherical mixing chamber being approximately 3 times that of the duct of the outlet 30. In an alternative arrangement (not shown), the steam superheater and reheater surfaces are disposed in a single duct discharging to the spherical mixing chamber.

In operation, sodium is recirculated around the portion 12 of the circuit containing the steam generating tubes 10 at a rate of approximately half the rate of flow through the core region so that the temperature of the combined flows of sodium entering the portion of the circuit containing the steam generating tubes is such that the heat flux at the steam generating tubes is less than that at which a departure from nucleate boiling occurs. The recirculation rate is variable by adjusting the speed of the recirculation pump 16 to control at a constant value the temperature of the sodium at the inlet to the recirculation branch 14. In alternative arrangements (not shown) anticipatory variations in the recirculation flow rate are effected responsive to the occurrence of variations from predetermined values respectively of the temperature of the sodium upon exit from the nuclear reactor 2, the rate of flow of the sodium and the outlet pressure of the steam.

Since heat fluxes in excess of that at which a departure from nucleate boiling occurs may be acceptable for limited periods of time, the recirculation pump need not be connected to an emergency standby source of power supply.

Figure 2:
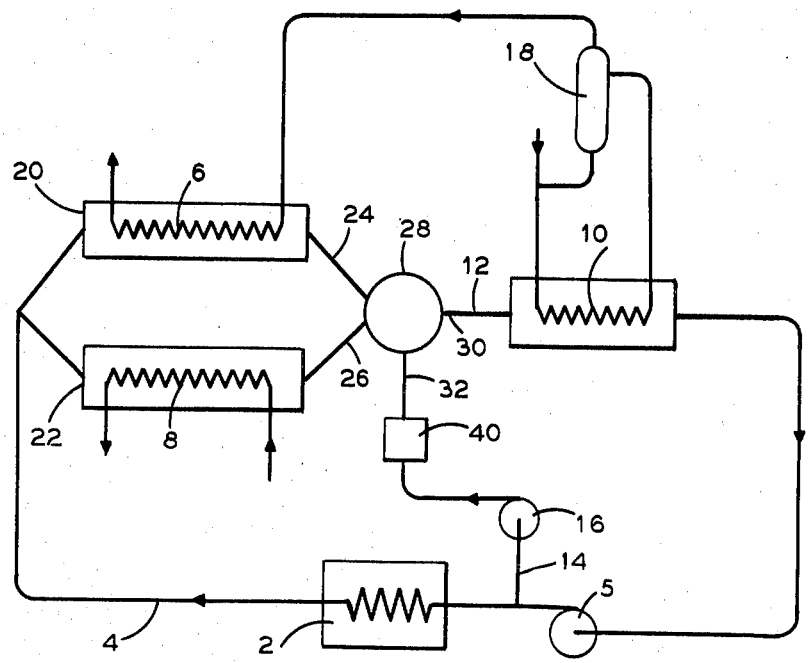
FIG. 2 is a schematic of a modification of the inventive arrangement shown in FIG. 1.

In a modification of the arrangement as shown in FIG. 2, the recirculation branch extends from a location downstream of the circulating pump 5, to the inlet 32 to the mixing chamber 28. The circulating pump 5 is then made of sufficient capacity to handle approximately 1½ times the rate of flow of sodium through the reactor 2 and a variable orifice 40 is positioned in the recirculation branch to vary the flow of sodium therein to control at a constant value the temperature of the sodium at the inlet to the recirculation branch. The variable orifice 40 is preferably a means provided to vary the rate of flow in the recirculation branch in accordance with variations in temperature at the inlet to the recirculation branch of the primary coolant from a predetermined temperature to tend to maintain constant or substantially constant the temperature of the primary coolant at the inlet to the recirculation branch. Pump 16 may be a variable speed pump provided in the recirculation branch to vary the rate of flow therein. The preferred means 40 may be arranged to vary the rate of recirculatory flow and also be responsive to occurrences of variations from predetermined values respectively of the temperature of the primary coolant upon exit from the nuclear reactor, the rate of flow of the primary coolant and the outlet pressure of the vapor to vary the rate of flow in the recirculation branch in anticipation of a variation in the temperature of the primary coolant at the inlet to the recirculation branch.

It will be appreciated that, in some arrangements, it may be possible to position the inlet to the recirculation branch at a region of the circuit downstream of a fraction of the steam generating tubes whilst maintaining a sufficient reduction in the heat flux. Alternatively, the transition zone of the steam generating tubes may be positioned out of sodium flow path, and the sodium recirculated to maintain constant the position of the transition zone, and ensure that the heat flux in the portion 12 of the circuit is sufficiently reduced.

It will also be appreciated that the portion of the circuit provided with the recirculation branch may contain economizer tube surfaces positioned upstream or downstream, in the sodium flow, of the steam generating tubes. Alternatively, the economizer tube surfaces may be positioned upstream of the outlet from the recirculation branch adjacent the superheating or reheating surfaces, either or both of which may be omitted.

Whilst the foregoing description relates to an arrangement in which a nuclear reaction is the source of heat and liquid metal the intermediate heat carrier it will be appreciated that other sources of heat and other intermediate heat carriers may be utilized or that the arrangement described may form an intermediate heat transfer circuit to transfer heat from a further circuit, such as an initial coolant circuit of a nuclear reactor, to a vapor generating and superheating circuit.

We claim:

1. A method of operating a nuclear reactor including a liquid metal primary coolant circuit arranged to transfer heat from a core region of the nuclear reactor to a tubulous vapor generating unit and having a recirculation branch connected around a portion of the circuit containing steam generating tubes and means arranged to circulate the primary coolant through the unit comprising, recirculating liquid metal primary coolant through the recirculation branch at a rate of at least half the rate of flow of liquid metal primary coolant through the core region to ensure that the heat flux at the steam generating tubes is less than that at which a departure from nucleate boiling occurs within the tubes.

2. The method of operating a nuclear reactor as claimed in claim 1, including measuring variations in the temperature of the liquid metal primary coolant in the recirculation branch from a predetermined temperature, and varying the rate of recirculatory flow in response to the temperature measurements.

3. The method of operating a nuclear reactor as claimed in claim 1, including restricting the rate of flow of liquid metal primary coolant in the recirculation branch.

4. A nuclear reactor including a liquid metal primary coolant circuit arranged to transfer heat from a core region of the nuclear reactor to a tubulous vapor generating unit and having a recirculation branch connected around a portion of the circuit containing vapor generating tubes and means arranged to recirculate the primary coolant through the branch at a rate sufficient to ensure that the heat flux at the vapor generating tubes is less than that at which a departure from nucleate boiling occurs within the tubes, and wherein a mixing chamber at the junction of the primary coolant circuit and the outlet of the recirculation branch is adapted to effect intimate mixing of coolant from the recirculation branch and coolant flowing in the primary coolant circuit.

5. A nuclear reactor as claimed in claim 4, wherein the mixing chamber is of spherical form and the inlet from the recirculation branch is disposed with the axis thereof on a radius of the chamber perpendicular to a diameter of the chamber coincident with the axes of the inlet from and the outlet to the primary coolant circuit disposed on opposite sides of the chamber.

6. A nuclear reactor as claimed in claim 5, wherein the mixing chamber is of a diameter approximately 3 times the diameter of the primary coolant outlet from the chamber.

7. A nuclear reactor including a liquid metal primary coolant circuit arranged to transfer heat from a core region of the nuclear reactor to a tubulous vapor generating unit and having a recirculation branch connected around a portion of the circuit containing vapor generating tubes and means arranged to recirculate the primary coolant through the branch at a rate sufficient to ensure that the heat flux at the vapor generating tubes is less than that at which a departure from nucleate boiling occurs within the tubes, and wherein means are provided to vary the rate of flow in the recirculation branch in accordance with variations in temperature at the inlet to the recirculation branch of the primary coolant from a predetermined temperature to tend to maintain constant or substantially constant the temperature of the primary coolant at the inlet to the recirculation branch.

8. A nuclear reactor as claimed in claim 7, wherein the means arranged to vary the rate of recirculatory flow are also responsive to the occurrences of variations from predetermined values respectively of the temperature of the primary coolant upon exit from the nuclear reactor, the rate of flow of the primary coolant and the outlet pressure of the vapor to vary the rate of flow in the recirculation branch in anticipation of a variation in the temperature of the primary coolant at the inlet to the recirculation branch.

9. A nuclear reactor as claimed in claim 7, wherein a variable speed pump is provided in the recirculation branch to vary the rate of flow therein.